(12) United States Patent
Ding

(10) Patent No.: US 12,222,042 B2
(45) Date of Patent: Feb. 11, 2025

(54) AIR VALVE ASSEMBLY AND INFLATABLE CUSHION

(71) Applicant: Xiaoping Ding, Guangzhou (CN)

(72) Inventor: Xiaoping Ding, Guangzhou (CN)

( * ) Notice: Subject to any disclaimer, the term of this patent is extended or adjusted under 35 U.S.C. 154(b) by 0 days.

(21) Appl. No.: 18/372,108

(22) Filed: Dec. 1, 2023

(65) Prior Publication Data

US 2024/0102571 A1  Mar. 28, 2024

Related U.S. Application Data

(63) Continuation-in-part of application No. PCT/CN2021/087337, filed on Apr. 15, 2021.

(51) Int. Cl.
*F16K 24/06* (2006.01)
*F16K 15/20* (2006.01)

(52) U.S. Cl.
CPC .............. *F16K 24/06* (2013.01); *F16K 15/20* (2013.01)

(58) Field of Classification Search
CPC ................................ F16K 24/06; F16K 15/20
See application file for complete search history.

(56) References Cited

U.S. PATENT DOCUMENTS

| 5,145,208 A | * | 9/1992 | Hoagland | ............... B60R 21/01 180/274 |
| 2008/0028730 A1 | * | 2/2008 | Savicki | ................... F01C 13/00 53/85 |
| 2016/0039592 A1 | * | 2/2016 | Zhang | ................. B65D 81/052 137/225 |
| 2016/0220773 A1 | * | 8/2016 | Chang | ............... A61M 16/0488 |

FOREIGN PATENT DOCUMENTS

| CN | 209976720 U | 1/2020 |
| CN | 210344415 U | 4/2020 |
| CN | 210566513 U | 5/2020 |
| CN | 111878353 A | 11/2020 |
| CN | 212368732 U | 1/2021 |
| CN | 214823796 U | 11/2021 |
| CN | 114041942 A | 2/2022 |
| EP | 0152401 A2 | 8/1985 |

* cited by examiner

*Primary Examiner* — Kevin R Barss
(74) *Attorney, Agent, or Firm* — Jose Cherson Weissbrot

(57) ABSTRACT

An air valve assembly and an inflatable cushion, which comprises an air storage bag, a first check valve and a second check valve. In specific application, the air valve assembly can be integrally installed on the inflatable cushion, and users can rapidly inflate inflatable products by repeatedly pressing the air storage bag. By arranging the first check valve and the second check valve, the inflatable product can be quickly inflated, and at the same time, the air of the inflatable product can be prevented from leaking to the outside during the inflation process, thus improving the air tightness of the inflatable product.

8 Claims, 15 Drawing Sheets

A—A

AIR VALVE ASSEMBLY AND INFLATABLE CUSHION

TECHNICAL FIELD

The present invention relates to the technical field of daily necessities, in particular to an air valve assembly and an inflatable cushion.

BACKGROUND

In daily life, inflatable products are widely used in cushions, mattresses, pillows, backrests, neck protectors, student bag straps or camera straps, etc., which bring people decompression and comfort. In order to enable inflatable products to be used repeatedly, inflatable products are generally provided with inflatable valves.

The inflation valve on the existing inflation products is generally a single inflation valve, which is usually difficult to process and requires high accuracy of the air inlet and the air outlet. Moreover, in long-term use, the inflation valve is also easy to be damaged, which leads to the deflation of the inflation products and affects the normal use of the inflation products.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

The present invention provides an air valve assembly comprising an air storage bag; and at least one first check valve communicated with the air storage bag, wherein an air inlet of the first check valve is communicated with the external environment, and an air outlet of the first check valve is communicated with the air storage bag; and at least one second check valve communicated with the air storage bag, wherein an air inlet of the second check valve is communicated with the air storage bag, and an air outlet of the second check valve is communicated with a chamber of an inflatable product; and wherein the air storage bag is formed by an air-tight and elastic sheet protruding from one side to the other, and the air storage bag has an edge with a first groove and a second groove, and the first check valve and the second check valve are respectively arranged in the first groove and the second groove.

The present invention provides an inflatable cushion comprising an air cushion body provided with a plurality of air bag units which are communicated with each other; and an air valve assembly comprise an air storage bag; and at least one first check valve communicated with the air storage bag, wherein an air inlet of the first check valve is communicated with the external environment, and an air outlet of the first check valve is communicated with the air storage bag; and at least one second check valve communicated with the air storage bag, wherein an air inlet of the second check valve is communicated with the air storage bag, and an air outlet of the second check valve is communicated with a chamber of an inflatable product; and wherein the air storage bag is formed by an air-tight and elastic sheet protruding from one side to the other, and the air storage hag has an edge with a first groove and a second groove, and the first check valve and the second check valve are respectively arranged in the first groove and the second groove.

Wherein, the air valve assembly further comprises a shell, wherein the first check valve and the second check valve are both arranged on the shell; and a buffer air chamber is arranged in the shell, and the buffer air chamber is communicated with the air storage bag, the first check valve and the second check valve are communicated through the buffer air chamber, and the shell can be arranged in the chamber of the inflatable product.

Wherein the air storage bag, the first check valve and the second check valve are all arranged on the air cushion body, and the air outlet of the second check valve is communicated with any one of the air bag units.

The present invention also provides an inflatable cushion, comprising an air cushion body having a plurality of interconnected air storage bags; and wherein any air storage bag on the outer periphery of the air cushion body is defined as a first air storage bag; and wherein, an edge of the first air storage bag is provided with a first groove communicated with the external environment, and a first check valve is arranged in the first groove; and a communicating position of the first air storage bag and the air storage bag communicated therewith is defined as a second groove, and a second check valve is arranged in the second groove; and an air inlet of the first check valve is communicated with the external environment, and an air outlet of the first check valve is communicated with the first air storage bag; and an air inlet of the second check valve is communicated with the first air storage bag, and an air outlet of the second check valve is communicated with other air storage bags.

Wherein, a bottom surface of the air cushion body is provided with a tightly attached bottom layer, and the first check valve and the second check valve are closely connected with the air cushion body and the bottom layer at the same time.

Wherein, an exhaust valve is arranged in any other air storage bag except the first air storage bag, and the exhaust valve is connected with the bottom surface.

BRIEF DESCRIPTION OF DRAWINGS

In order to explain the technical solution of this application more clearly, the drawings needed in the implementation will be briefly introduced below. Obviously, the drawings described below are only sonic implementations of this application. For those skilled in the art, other drawings can be obtained according to these drawings without creative work.

Figure 1:
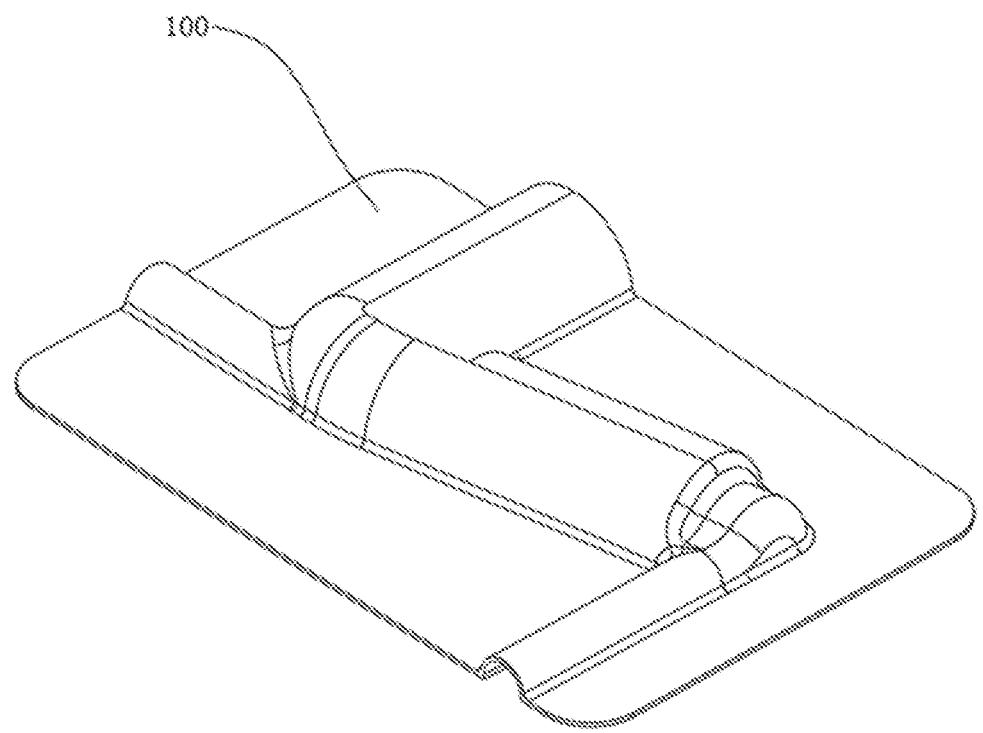
FIG. 1 is a schematic structural diagram of an air valve assembly in an embodiment of the present invention.

In the drawings: Shell, 100; First check valve, 200; Valve body connector, 210; Resisting part, 211; Valve body, 220; Air inlet, 221; Air outlet, 222; Ball, 223; Tail part, 224; Second check valve, 300; First hot-melt layer, 301; Second hot-melt layer, 302; Airflow channel, 303; Buffer air chamber, 400; Hot-melt component, 500; First sleeve, 510; Second sleeve, 520; Snap ring, 600; Air cushion body, 700; Airbag unit, 710; Convex hull, 720; Bottom layer, 730; Anti-slip layer, 731; Wrapping layer, 732; Anti-slip bumps, 733; Mounting cavity, 740; Sheet, 745; First groove, 746; Second groove, 747; Air storage bag, 750; First air storage bag, 751; Exhaust valve, 800; Exhaust nozzle, 810; Stopping part, 811; Pressing head, 820; Limiting part, 822; Exhaust spring, 830.

DESCRIPTION OF EMBODIMENTS

In describing the preferred embodiments, specific terminology will be resorted to for the sake of clarity. It is to be understood that each specific term includes all technical equivalents which operate in a similar manner to accomplish a similar purpose.

While various aspects and features of certain embodiments have been summarized above, the following detailed description illustrates a few exemplary embodiments in further detail to enable one skilled in the art to practice such embodiments. Reference will now be made in detail to embodiments of the inventive concept, examples of which are illustrated in the accompanying drawings. The accompanying drawings are not necessarily drawn to scale. The described examples are provided for illustrative purposes and are not intended to limit the scope of the invention. It should be understood, however, that persons having ordinary skill in the art may practice the inventive concept without these specific details.

It will be understood that, although the terms first, second, etc. may be used herein to describe various elements, these elements should not be limited by these terms. These terms are only used to distinguish one element from another. For example, a first attachment could be termed a second attachment, and, similarly, a second attachment could be termed a first attachment, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

As used in the description of the inventive concept and the appended claims, the singular forms "a," "an," and "the" are intended to include the plural forms as well, unless the context clearly indicates other.

The present invention discloses a gas air valve assembly, which includes an air storage bag 750, a first check valve 200 and a second check valve 300, wherein the air inlet of the first check valve 200 is communicated with the external environment, the air outlet of the first check valve 200 is communicated with the air storage bag 750, the air inlet of the second check valve 300 is communicated with the chamber of an inflatable product.

In addition, in order to improve the stability of the air valve assembly and the air tightness of the inflatable product, the first check valve 200 and the second check valve 300 each have at least one. It should be understood that when there are more than one first check valve 200 and one second check valve 300, two adjacent first check valves 200 are communicated in turn, and similarly, two adjacent second check valves 300 are communicated in turn.

Of course, in another embodiment, each first check valve 200 is set independently and at intervals, and each second check valve 300 is also set independently and at intervals. It can be understood that all the first check valves 200 are correspondingly communicated with the second check valve 300 through the air storage bag 750. Obviously, in this embodiment, the inflation rate of inflatable products can be accelerated by setting a plurality of first check valves 200 and a plurality of second check valves 300. At the same time, When one of the first check valves 200 or the second check valve 300 is damaged or blocked, the remaining first check valves 200 and the second check valve 300 can still play the role of inflation, thus largely ensuring the stability of the air valve assembly and the air tightness of the inflation product, and prolonging the service life of the inflation product.

It should be noted that, in the present invention, the first check valve 200 and the second check valve 300 are both made of elastic silica gel, and the air outlets of the first check valve 200 and the second check valve 300 are both slits, which are in a closed state in a normal state. When the air pressure inside the first check valve 200 is greater than the air pressure outside, the air outlets are opened wider the action of air pressure, otherwise, the air outlets are closed under the action of their own elasticity, which is the same for the opening and closing of the air outlet of the second check valve 300.

The air valve assembly can be integrally installed on an inflatable product in a specific application. When the inflatable product needs to be inflated, the air in the air storage bag 750 pushes open the second check valve 300, and the air enters the chamber of the inflatable product through the second check valve 300, thereby inflating the inflatable product. When the air storage bag 750 is released, the second check valve 300 is closed due to the pressure difference, external air enters the air storage bag 750 through the first check valve 200, and the first check valve 200 is automatically closed after the internal and external pressures are balanced, so that the air storage bag 750 completes gas storage. According to the above inflation principle, the user can rapidly inflate the inflatable product by repeatedly pressing the air storage bag 750.

By arranging the first check valve 200 and the second check valve 300 which are matched with each other, the air valve assembly can ensure that the inflatable product can be inflated quickly, and at the same time, it can prevent the air from leaking to the outside during the inflation process of the inflatable product, thus improving the air tightness of the inflatable product.

Figure 5:
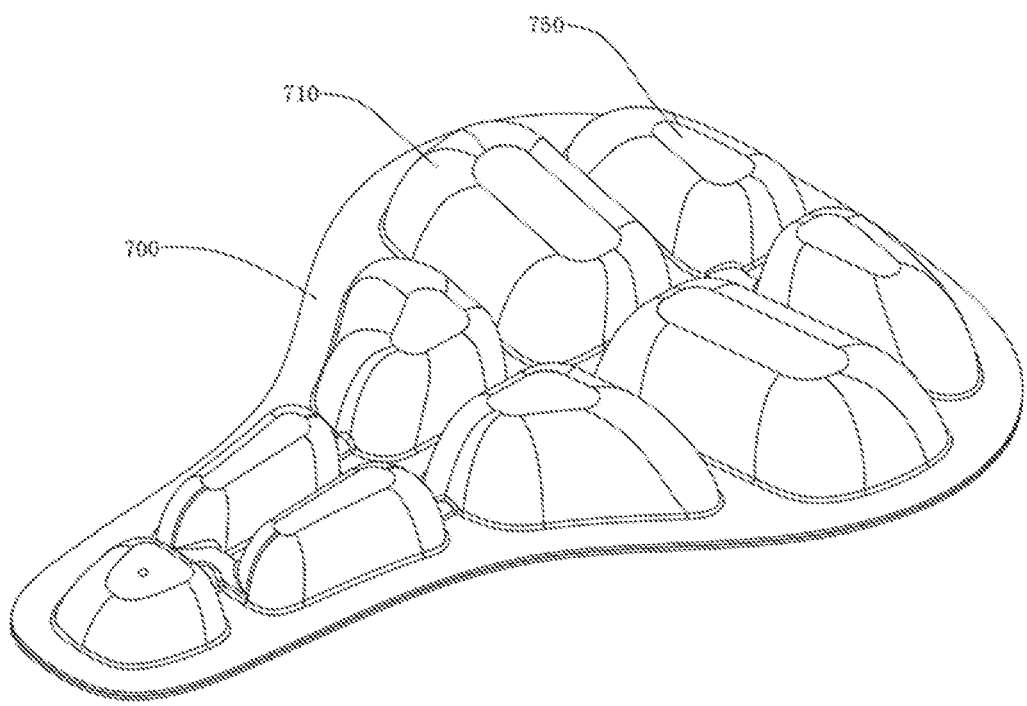
FIG. 5 is a schematic structural diagram of an inflatable cushion in an embodiment of the present invention.
Figure 6:
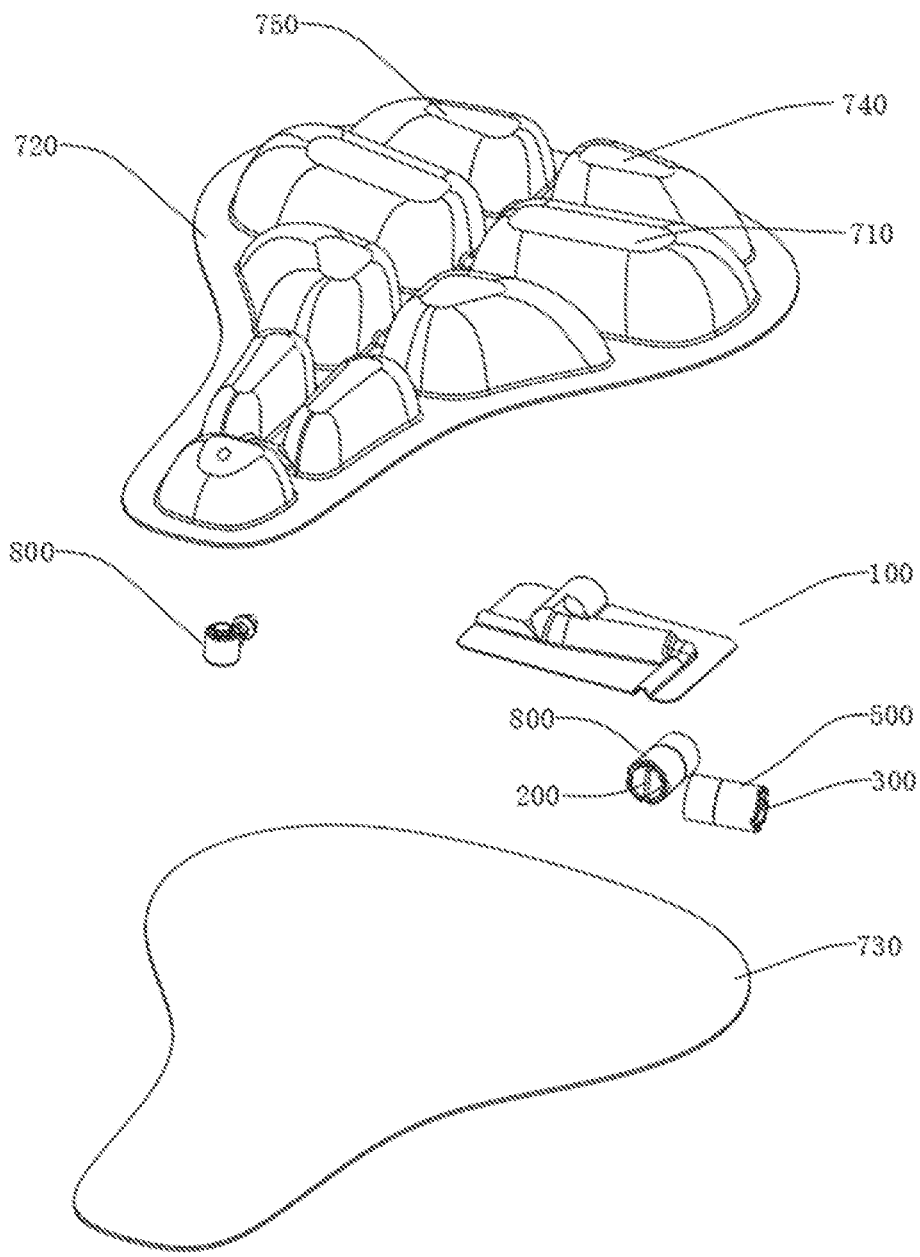
FIG. 6 is an exploded view of the inflatable cushion in the embodiment of the present invention.
Figure 7:
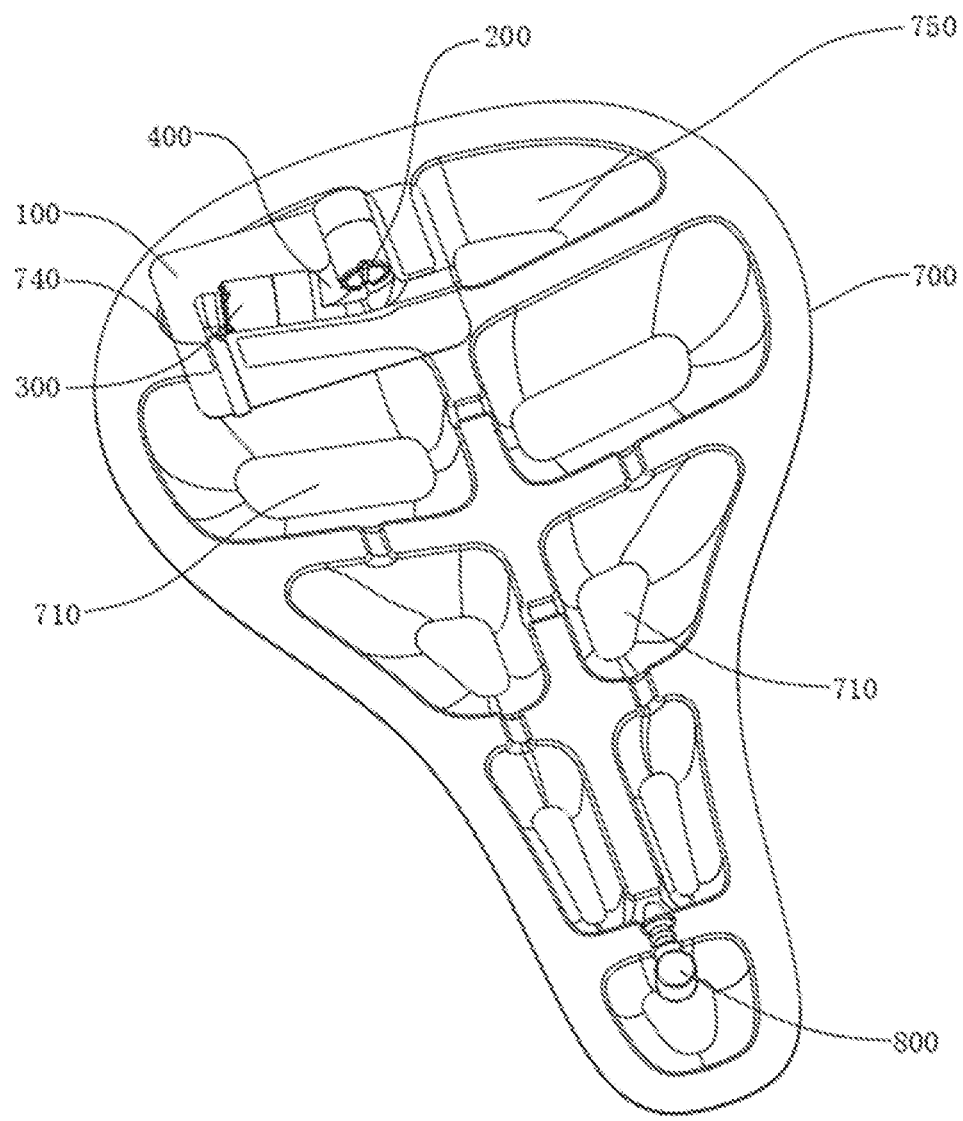
FIG. 7 is a schematic structural view of the inflatable cushion after the bottom layer is hidden in the embodiment of the present invention.

In addition, referring to FIGS. 5, 6 and 7, the present invention also discloses an inflatable cushion, which includes an air cushion body 700 and the above-mentioned air valve assembly, wherein the air cushion body 700 is provided with a plurality of interconnected airbag units 710, and the air storage bag 750, the first check valve 200 and the second check valve 300 are all arranged on the air cushion body 700, and the air outlet of the second check valve 300 is communicated with any one of the airbag units 710.

Obviously, the inflatable cushion has the same technical effect as the above-mentioned air valve assembly. It is easy to understand that the inflatable cushion does not need an external inflatable device such as an additional inflator, and the user can simply press the air storage bag 750 to inflate the airbag unit 710 on the inflatable cushion, which is simple and quick to operate and also ensures the overall air tightness of the inflatable cushion.

In some embodiments of the present invention, referring to FIGS. 1 to 6 again, it further includes a shell 100, wherein the first check valve 200 and the second check valve 300 are both arranged on the shell 100, and a buffer air chamber 400 is arranged in the shell 100 and is communicated with the air storage bag 750; the first check valve 200 and the second check valve 300 are communicated through the buffer air chamber 400, and the shell 100 can be arranged in the chamber of the inflatable product.

In this embodiment, the air cushion body 700 is also provided with a mounting cavity 740 for mounting the shell 100.

Now, taking the inflatable cushion of this embodiment as an example, the working principle and operation mode of this air valve assembly will be explained.

Referring to FIGS. 5, 6 and 7, it should be understood that the mounting cavity 740 is arranged on the air cushion body 700, and the shell 100 of the air valve assembly is arranged in the mounting cavity 740, so that the whole air valve assembly is located in the mounting cavity 740. The effective arrangement of the mounting cavity 740 effectively prevents the whole air valve assembly from being exposed to the air, thus ensuring the structural and functional stability of the air valve assembly and the air tightness of the air cushion. The air storage bag 750 communicating with the buffer air chamber 400 can skillfully play the role of an air pump. It should be understood that the air cushion body 700, the airbag unit 710 and the air storage bag 750 on it all have certain elasticity and the function of recovering deformation.

With particular reference to FIG. 7, when the air storage bag 750 communicating with the buffer air chamber 400 is pressed, the air in the air storage bag 750 will quickly squeeze into the buffer air chamber 400. At this time, the air pressure in the buffer air chamber 400 is higher than the air pressure of the adjacent airbag unit 710 and the air pressure of the external environment. Under the action of internal and external pressure difference, the air outlet of the second check valve 300 is opened, the air outlet of the first check valve 200 is closed, and the air in the buffer air chamber 400 passes through the second check valve 300. When the air storage bag 750 communicating with the buffer air chamber 400 is released, the air in the buffer air chamber 400 is sucked into the air storage bag 750, at this time, the air pressure of the buffer air chamber 400 is lower than the air pressure in the adjacent air bag unit and the air pressure of the external environment, and the air outlet of the second check valve 300 is closed and the air outlet of the first check valve 200 is opened under the action of pressure difference and its own elastic force. Since the air inlet of the first check valve 200 communicates with the external environment, air from the outside enters the buffer air chamber 400 and the air storage bag 750 communicating with the buffer air chamber 400 through the first check valve 200. When the pressure difference between the inside and outside of the first check valve 200 is balanced, the air outlet of the first check valve 200 is closed under the action of its own elastic force, thus realizing the air storage of the air storage bag 750.

Obviously, by repeatedly pressing the air storage bag 750, the air cushion body 700 and a plurality of airbag units 710 on the air cushion body 700 can be rapidly inflated, and there is no need to set up an external inflating device such as an additional inflator, so that the user can inflate the inflatable cushion through a simple pressing action, the operation is simple and quick, and the overall air tightness of the inflatable cushion is ensured. Our hand press inflatable products are more convenient than the kind on the market that carries a separate inflatable tube, in addition to the press inflatable structure added to the product, the product appearance is also beautiful.

Obviously, by arranging a shell 100, the first check valve 200 and the second check valve 300 can be arranged in the shell 100 together, so that the whole air valve assembly can be integrated into an integral piece, thereby facilitating the whole air valve assembly to be arranged in the mounting cavity 740.

When the air valve assembly is matched with the inflatable cushion, the air valve assembly can be integrally arranged in the mounting cavity 740 of the air cushion body 700. It should be understood that the side wall of the mounting cavity 740 is usually provided with an air hole for communicating with the air inlet of the first check valve 200, that is, the air inlet of the first check valve 200 is located on the side wall of the mounting cavity 740. Obviously, the shell 100 and the mounting cavity 740 cover the first check valve 200 and the second check valve 300, which prevents the first check valve 200 and the second check valve 300 from being directly exposed to the air, effectively ensures the structural stability of the first check valve 200 and the second check valve 300, and enhances the air tightness of the inflatable cushion.

By arranging the first check valve 200 and the second check valve 300 which are matched with each other, and at the same time, with the buffer function of the pre-stored air pressure in the buffer air chamber 400, the air valve assembly and the inflatable cushion can ensure that the inflatable cushion can be inflated quickly, and at the same time, the air of the inflatable cushion can be prevented from leaking to the outside during the inflation process, thus improving the air tightness of the inflatable cushion.

In some embodiments of the present invention, referring to FIGS. 1, 2, 3 and 7 again, it should be noted that the conventional air valve is basically made of silica gel, and the first check valve 200 and the second check valve 300 in the present invention are both made of elastic silica gel.

In some embodiments of the present invention, in order to better fuse the first check valve 200 and the second check valve 300 in the inflatable product and enhance the air tightness of the whole air valve assembly and the inflatable product, hot-melt components 500 are sleeved on the outer walls of the first check valve 200 and the second check valve 300, and the hot-melt components 500 are fixed in the shell 100. In this embodiment, both the hot-melt component 500 and the shell 100 are made of hot-melt materials, such as TPU material, PVC material, PE material, etc., so that they can be well connected by hot-melt, and in order to ensure the air tightness between the first check valve 200 and the second check valve 300 and the hot-melt component 500, both the first check valve 200 and the second check valve 300 are bonded to the hot-melt component 500, that is, the peripheral walls of the first check valve 200 and the second check valve 300 are closely adhered to the hot-melt component 500 to prevent air leakage.

Figure 2:
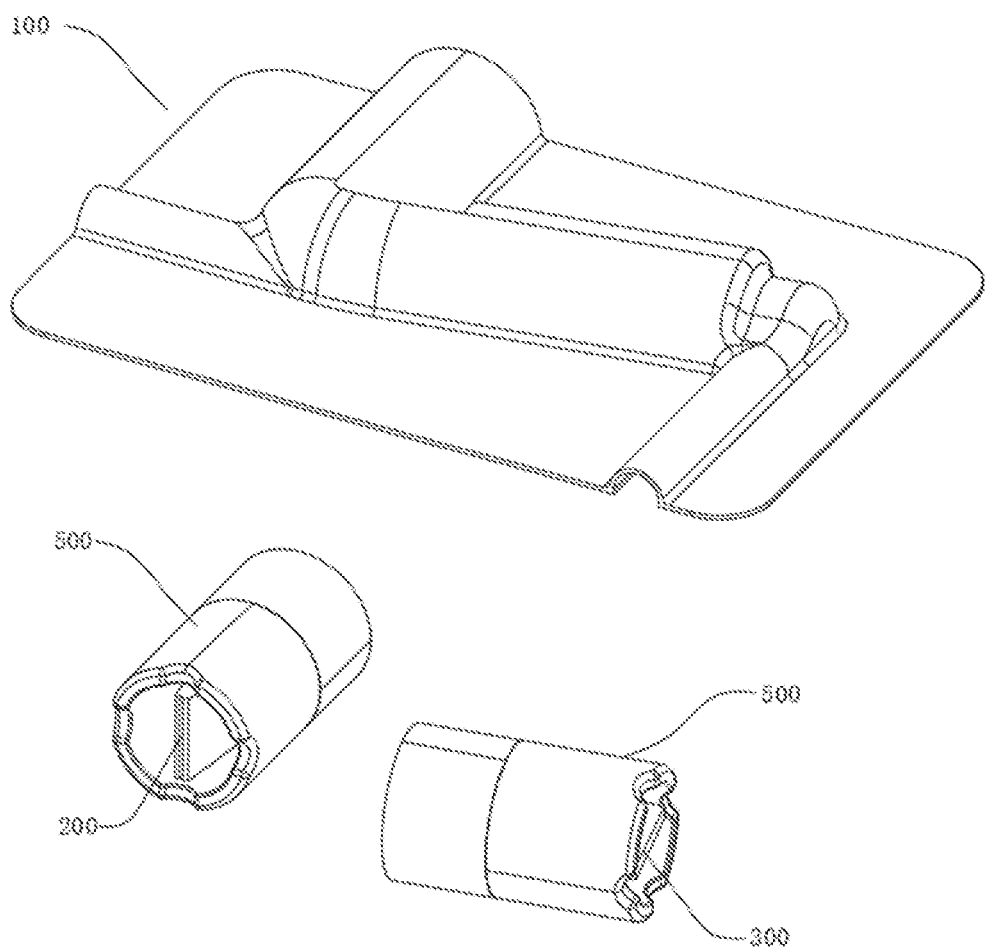
FIG. 2 is an exploded view of the air valve assembly in the embodiment of the present invention.
Figure 3:
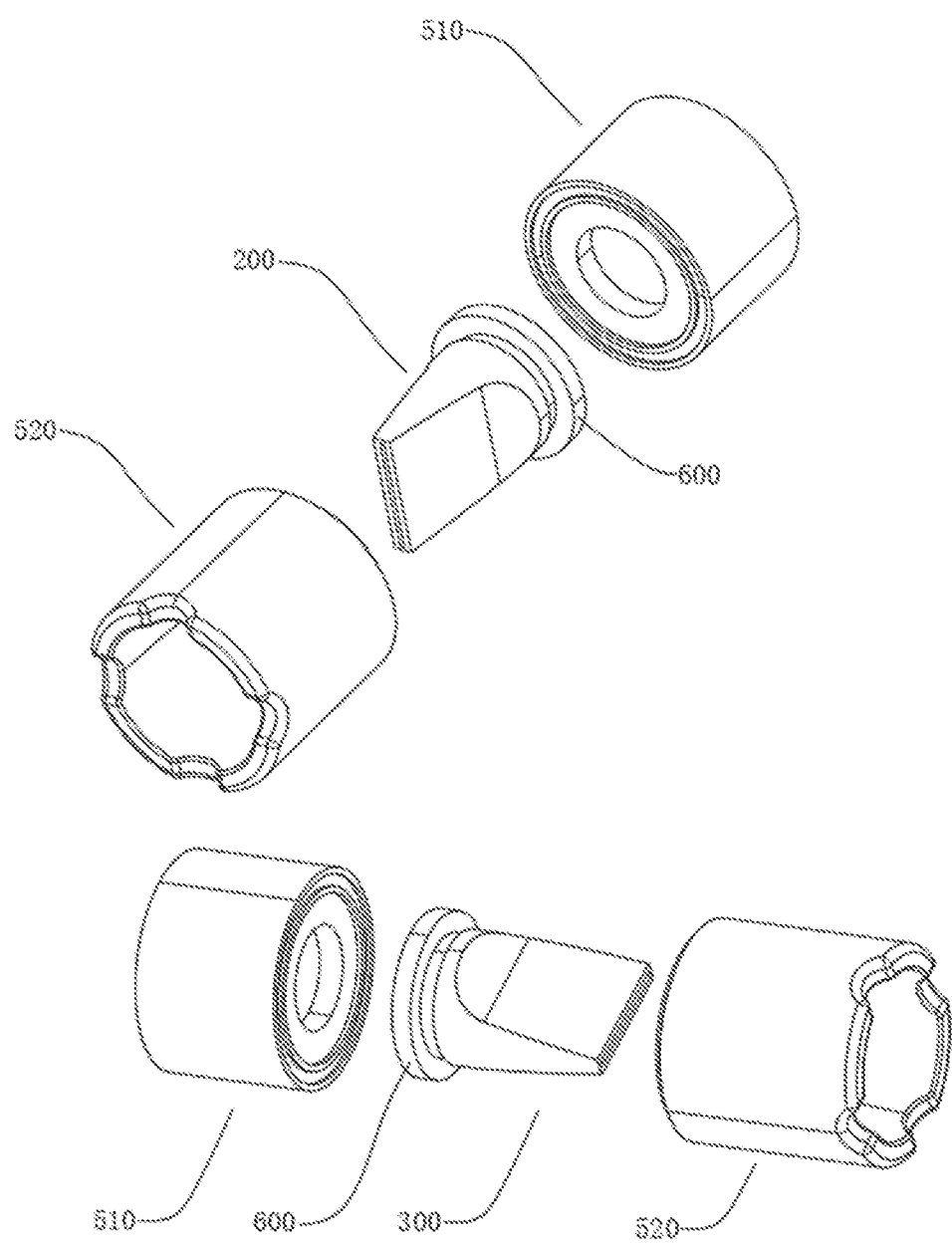
FIG. 3 is an exploded view of the hot-melt component in the embodiment of the present invention.
Figure 4:
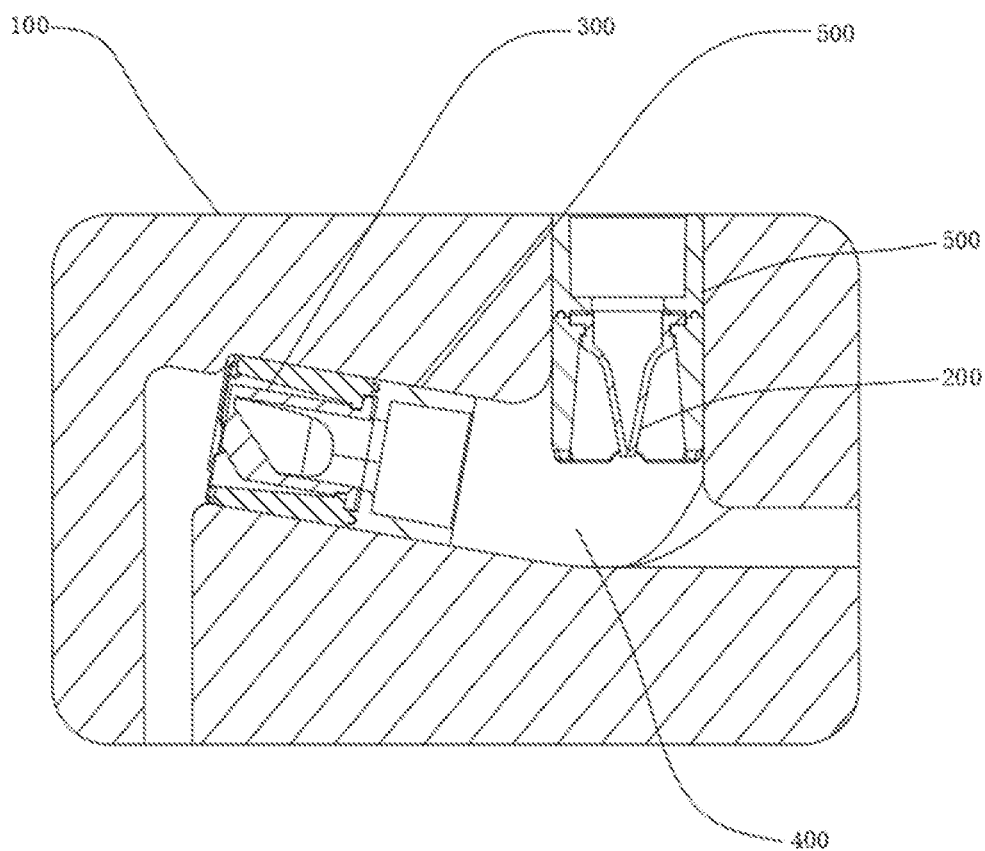
FIG. 4 is a sectional view of the internal structure of the air valve assembly in the embodiment of the present invention.

Specifically, in order to further strengthen the airtightness between the first check valve 200 and the second check valve 300 and the hot-melt component 500, referring to FIGS. 2, 3 and 4, the hot-melt component 500 includes a first sleeve 510 and a second sleeve 520 which are clamped with each other, and the first check valve 200 or the second check valve 300 is embedded between the first sleeve 510 and the second sleeve 520.

Moreover, in order to facilitate the installation of the first check valve 200 or the second check valve 300 between the first sleeve 510 and the second sleeve 520, the end of the first check valve 200 and the end of the second check valve 300 are both provided with snap rings 600, and the first sleeve 510 and the second sleeve 520 are respectively provided with a first clamping groove and a second clamping groove matched with both ends of the snap rings 600.

It should be noted that in this embodiment, the first sleeve 510 and the second sleeve are butted and communicated with each other, and the first check valve 200 or the second check valve 300 is tightly clamped on the inner walls of the first sleeve 510 and the second sleeve, thus ensuring the air tightness between the first check valve 200 and the second check valve 300 and the hot-melt component 500.

In addition, in some embodiments of an inflatable cushion disclosed by the present invention, in order to facilitate the matching processing of the air valve assembly and the inflatable cushion, referring to FIGS. 6 and 7, the air cushion body 700 includes a convex hull layer 720 and a bottom layer 730 which are connected with each other by hot melt, and the shell 100 is connected with the bottom layer 730 by hot melt, and the air cushion body 700 is made of hot-melt materials. In this embodiment, the air cushion body 700 is made of a TPU material, that is, the convex hull layer 720 and the bottom layer 730 are both made of a TPU material, and the shell 100 of the air valve assembly is also made of a TPU material, which can be well welded.

When processing the inflatable cushion, the whole air valve assembly can be processed in advance, and then the shell 100 of the air valve assembly can be welded to the corresponding position on the surface of the bottom layer 730, and finally the convex hull layer 720 and the bottom layer 730 can be welded to each other. It should be noted that the convex hull layer 720 has a plurality of convex hulls, and after the convex hull layer 720 and the bottom layer 730 are hot-melt connected, a plurality of airbag units 710, mounting cavities 740 and air storage bags 750 are sealed, and the whole air valve assembly is located in the mounting cavity 740, which facilitates the matching processing of the air valve assembly and the inflatable cushion and ensures the structural stability of the inflatable cushion.

Figure 8:
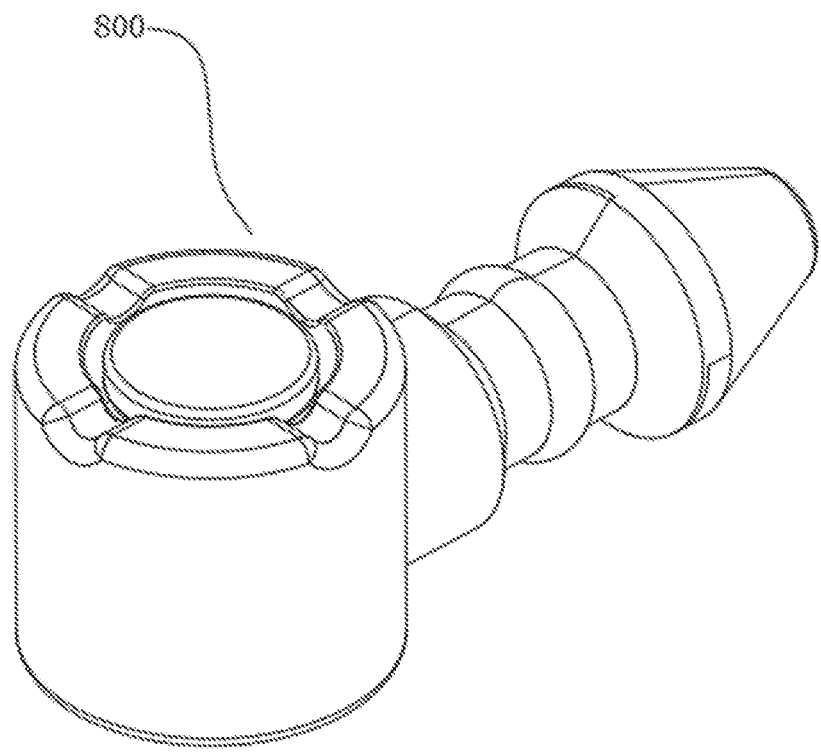
FIG. 8 is a schematic structural diagram of an exhaust valve in an embodiment of the present invention.
Figure 9:
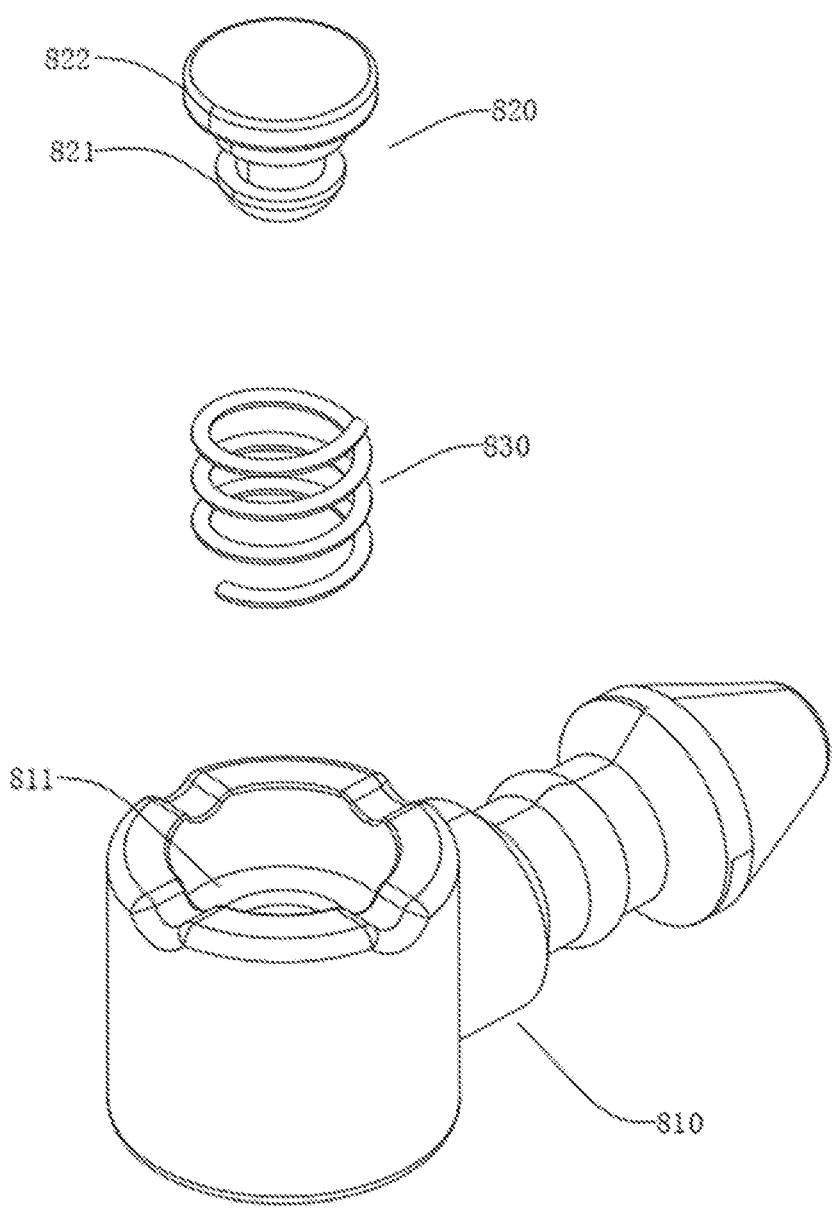
FIG. 9 is an exploded view of the exhaust valve in the embodiment of the present invention.

In addition, in some embodiments of the present invention, referring to FIGS. 6, 8 and 9, in order to facilitate the deflation of the whole inflatable cushion, the air cushion body 700 is also provided with an exhaust valve 800 for exhausting air, and the exhaust valve 800 is communicated with any airbag unit 710. Specifically, the exhaust valve 800 includes an exhaust nozzle 810, a pressing head 820 and an exhaust spring 830, wherein the exhaust nozzle 810 is provided with an exhaust passage communicating with the airbag unit 710; one end of the pressing head 820 is provided with a plug 821 for movably blocking the exhaust passage; a stopping part 811 matched with the plug 821 is arranged in the exhaust passage; the other end of the pressing head 820 is provided with a limiting part 822; and the exhaust spring 830 is sandwiched between the limiting part 822 and the stopping part 811, which ensures that the plug 821 of the pressing head 820 completely blocks the outlet of the exhaust passage in a normal state.

Figure 10:
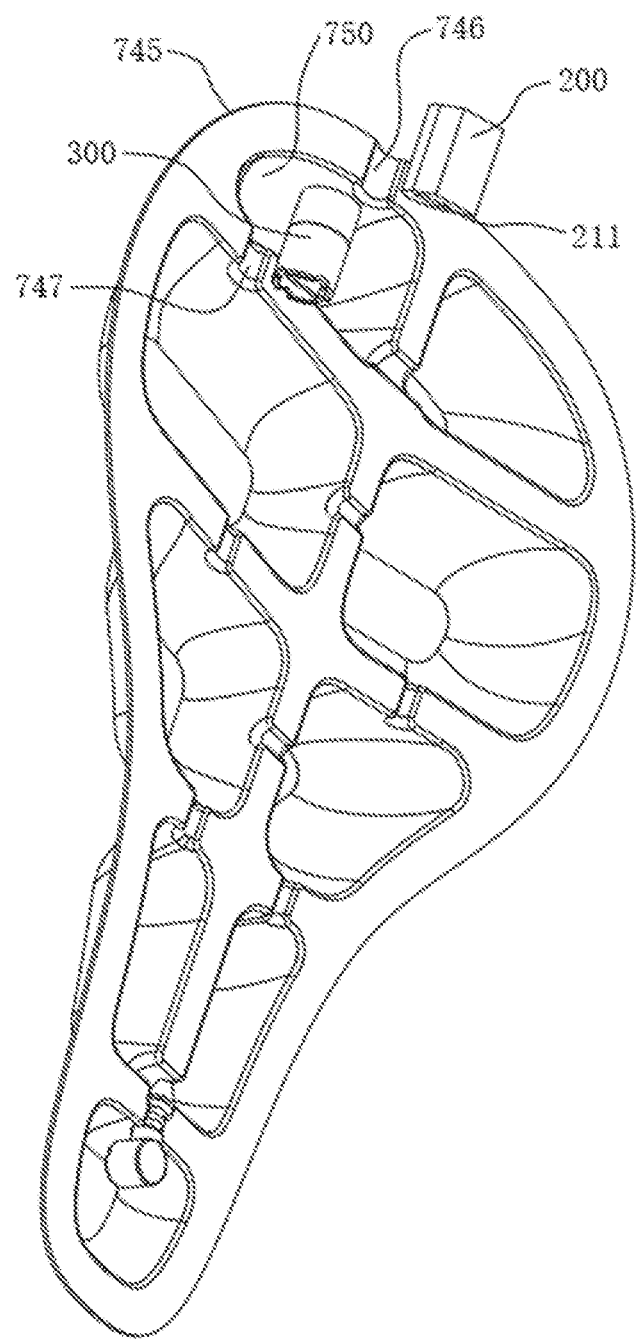
FIG. 10 is a structural schematic diagram of another embodiment of the present invention.

As shown in FIG. 10, in another embodiment, an air storage bag 750 is formed by an impermeable and elastic sheet 745 protruding from one side to the other. The air storage bag 750 has an edge with a first groove 746 and a second groove 747, and the first check valve 200 and the second check valve 300 are respectively arranged in the first groove 746 and the second groove 747.

Figure 11:
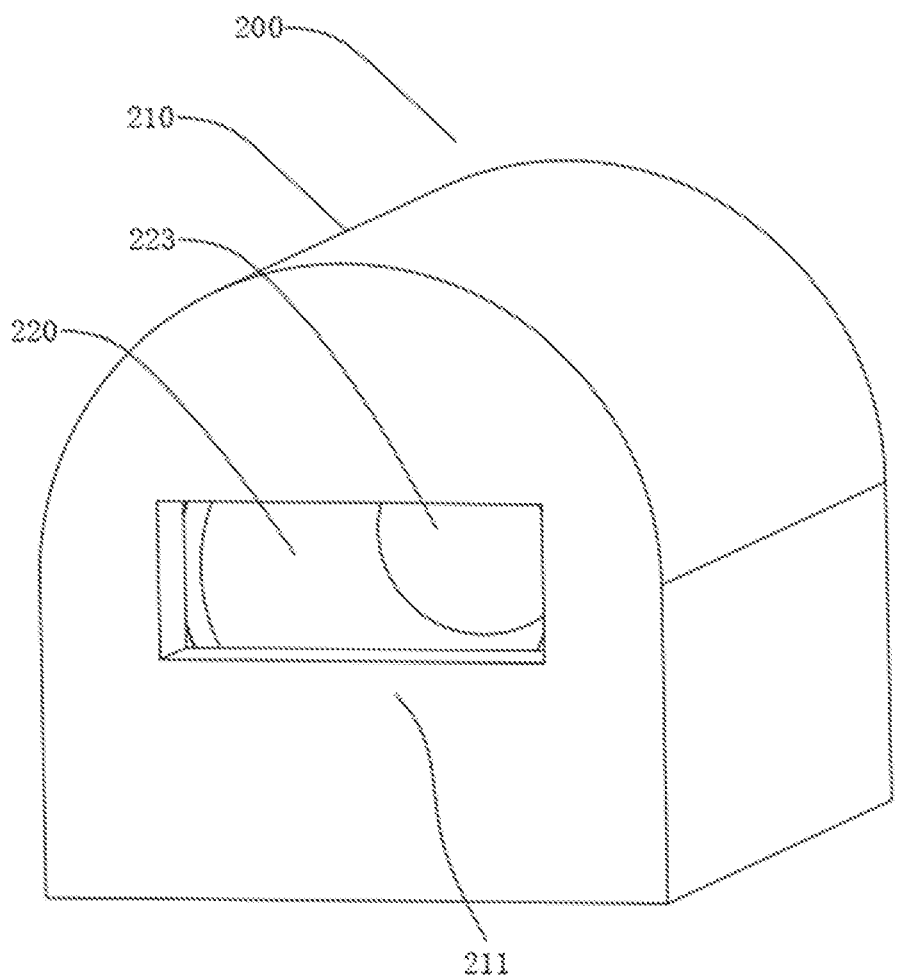
FIG. 11 is a schematic structural view of another embodiment of the first check valve in the present invention.
Figure 12:
FIG. 12 is a top view of another embodiment of the first check valve in the present invention.
Figure 13:
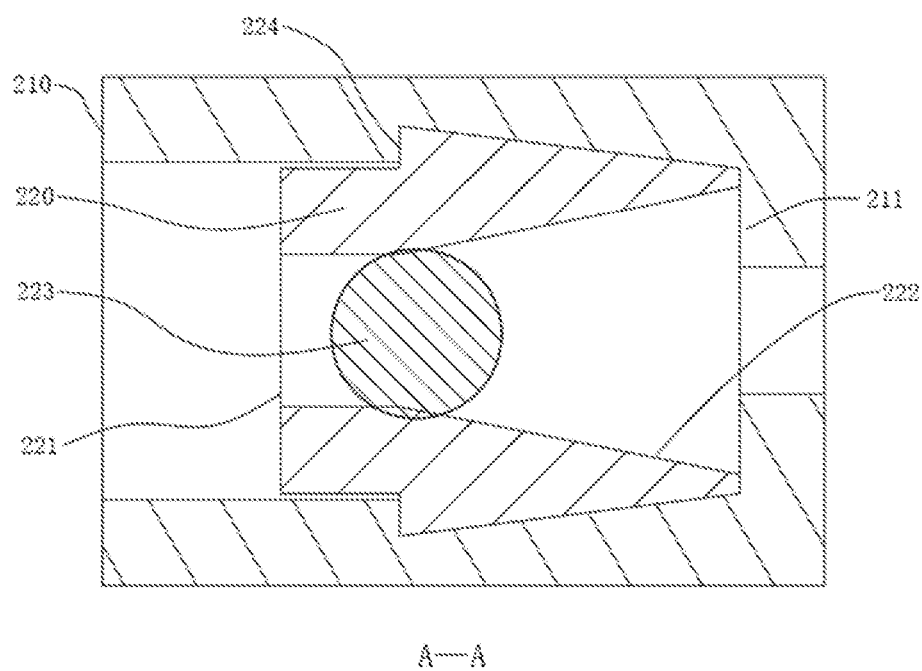
FIG. 13 is a cross-sectional view of FIG. 12A-A.

As show in FIGS. 11 to 13, the first check valve 200 includes a valve body connector 210 with a hollow structure, and a valve body 220 is arranged in the valve body connector 210. The valve body 220 includes a circular air inlet 221 and a conical air outlet 222, and a ball 223 is arranged in the air outlet 222.

An end of the valve body connector 210 near the air outlet 222 is provided with a resisting part 211 for preventing the valve body 220 and the ball 223 from slipping out of the valve body connector 210. The air inlet 221 of the valve body 220 is also provided with a tail part 224 for preventing the valve body 220 from falling out of the valve body connector 210. In this embodiment, the valve body 220 is made of a hard material; The valve body connector 210 is made of a flexible hot-melt material.

Figure 14:
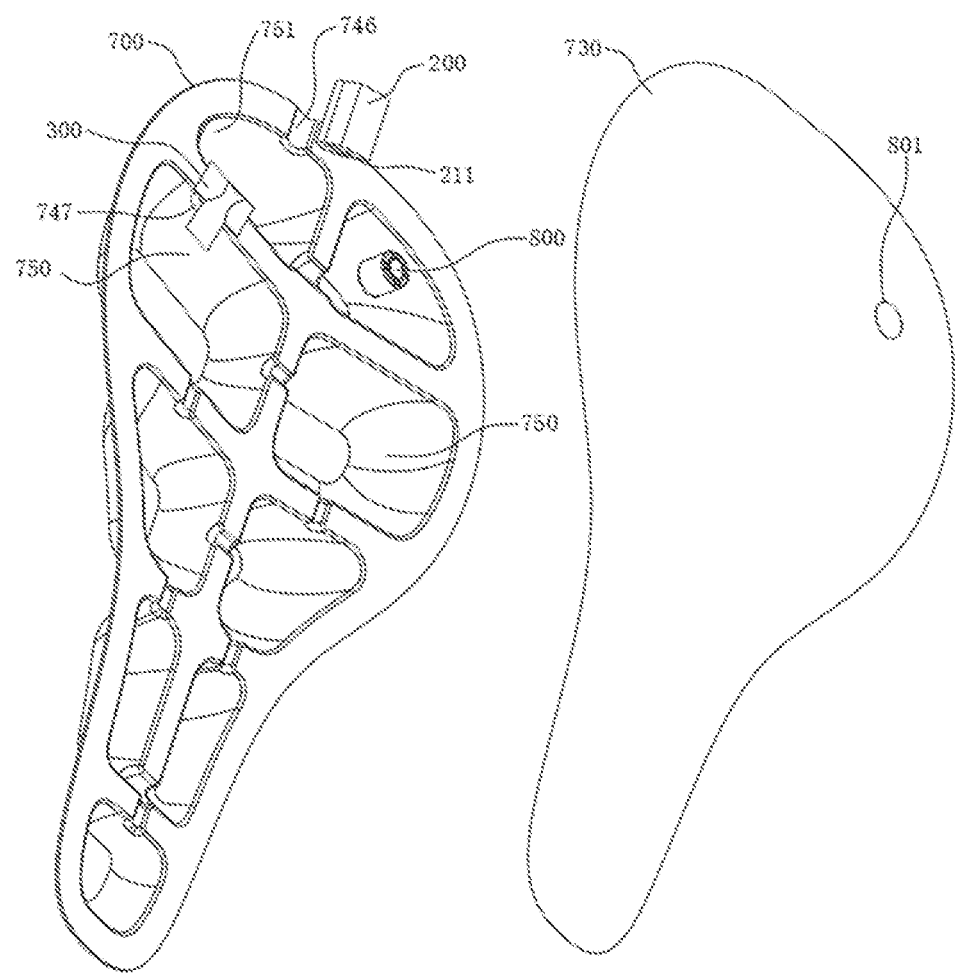
FIG. 14 is a structural schematic diagram of a third embodiment of the present invention.
Figure 15:
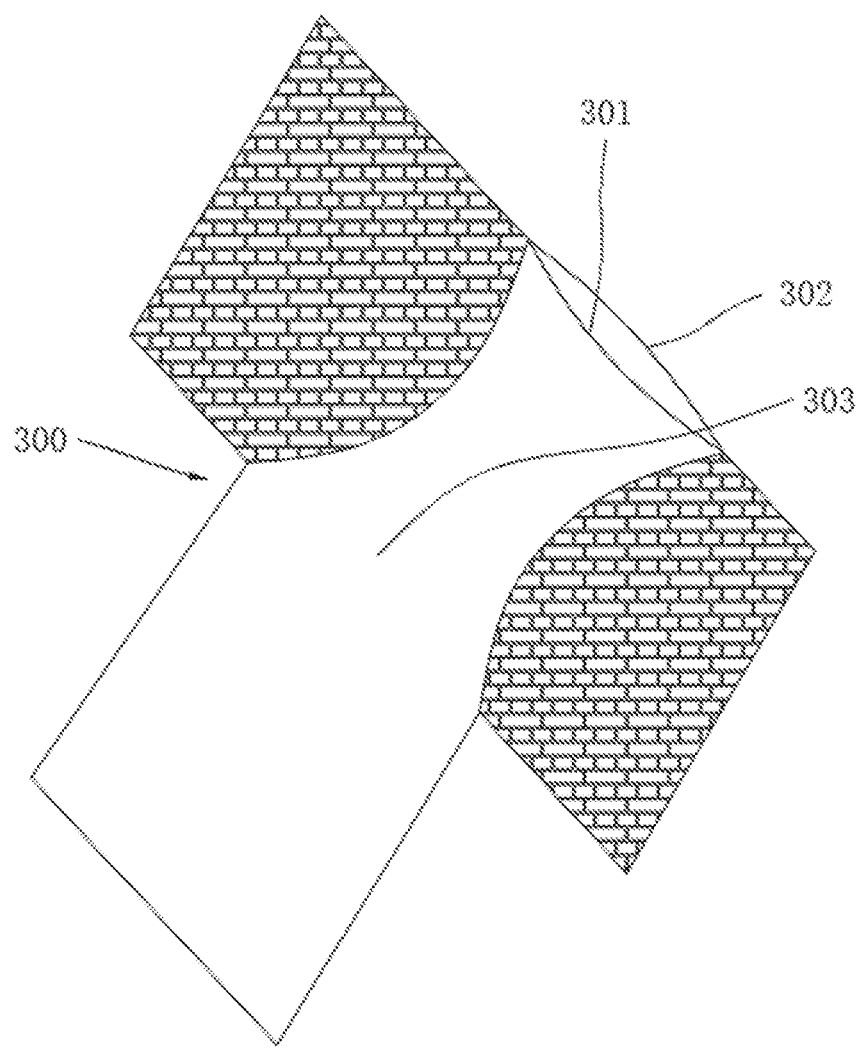
FIG. 15 is a schematic structural view of another embodiment of the second check valve in the present invention.
Figure 16:
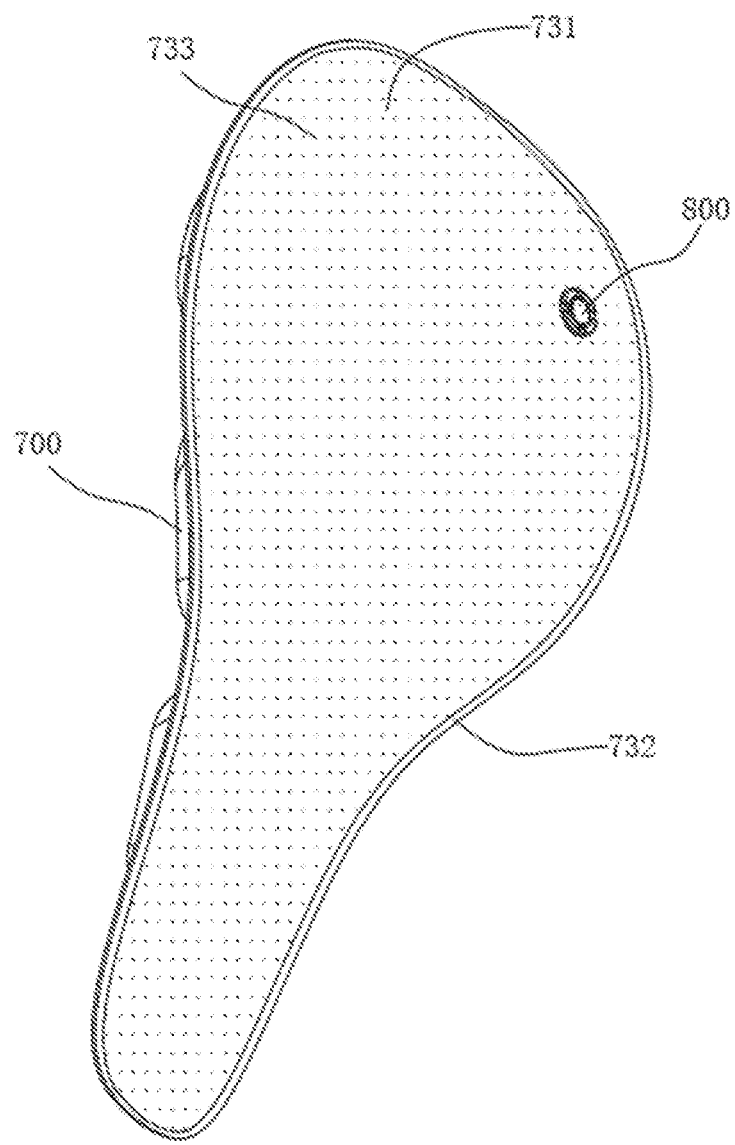
FIG. 16 is a schematic structural view from another perspective of the third embodiment of the present invention.

As shown in FIGS. 14 to 16, another inflatable cushion disclosed in the present invention includes an air cushion body 700 having a plurality of air storage bags 750 communicated with each other, and any air storage bag 750 on the periphery of the air cushion body 700 is used as a first air storage bag 751.

The edge of the first air storage bag 751 is provided with a first groove 746 communicating with the external environment, and a first check valve 200 is arranged in the first groove 746; a second groove 747 is arranged at the communication position of the first air storage bag 751 and the air storage bag 750 communicated therewith, and the second check valve 300 is arranged in the second groove 747; the air inlet of the first check valve 200 communicates with the external environment, and the air outlet of the first check valve 200 communicates with the first air storage bag 751; the air inlet of the second check valve 300 communicates with the first air storage bag 751, and the air outlet of the second check valve 300 communicates with other air storage bags 750.

The first check valve 200 includes a valve body connector 210 with a hollow structure, and a valve body 220 is arranged in the valve body connector 210; the valve body 220 includes a circular air inlet 221 and a conical air outlet 222, and a ball 223 is arranged in the air outlet 222; an end of the valve body connector 210 near the air outlet 222 is provided with a resisting part 211 for preventing the valve body 220 and the ball 223 from slipping out of the valve body connector 210; the air inlet 221 of the valve body 220 is also provided with a tail part 224 for preventing the valve body 220 from falling out of the valve body connector 210.

The second check valve 300 is made of the flexible and hot-melt first hot-melt layer 301 and second hot-melt layer 302, and an air flow channel 303 is formed between the first hot-melt layer 301 and the second hot-melt layer 302, and the air inlet of the second check valve 300 has an opening under normal conditions; the air outlet of the second check valve 300 does not have an opening under normal conditions.

The bottom surface of the air cushion body 700 is provided with a tightly attached bottom layer 730, and the first check valve 200 and the second check valve 300 are closely connected with the air cushion body 700 and the bottom layer 730 at the same time; in this embodiment, the air cushion body 700 is hot-melt connected with the bottom layer 730 and the first check valve 200 and the second check valve 300 are hot-melt connected with the air cushion body 700 and the bottom layer 730 at the same time.

An exhaust valve 800 is arranged in any other air storage bag 750 except the first air storage bag 751, and the exhaust valve 800 is connected with the bottom layer 730 through an exhaust nozzle 810. Preferably, the exhaust valve 800 is provided beside the first air storage bag 751.

On the side of the bottom layer 730 far away from the air cushion body 700, an anti-slip layer 731 is provided, and anti-slip bumps 733 are arranged regularly on the anti-slip layer 731. A wrapping layer 732 covering the air cushion body 700, the bottom layer 730 and the anti-slip layer 731 is sewn on the outer edge of the air cushion body 700.

The technical means disclosed in the scheme of the present invention are not limited to the technical means disclosed in the above embodiments, but also include the technical scheme composed of any combination of the above technical features. It should be pointed out that for those skilled in the art, several improvements and embellishments can be made without departing from the principle of the present invention, and these improvements and embellishments are also regarded as the protection scope of the present invention.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a. process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may he added to, removed from or rearranged compared to the disclosed examples.

The invention has now been described in detail for the purposes of clarity and understanding. However, those skilled in the art will appreciate that certain changes and modifications may be practiced within the scope of the appended claims.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

What is claimed is:

1. An air valve assembly comprising:
   an air storage bag; and
   at least one first check valve communicated with the air storage bag, wherein an air inlet of said first check valve is communicated with the external environment, and an air outlet of said first check valve is communicated with the air storage bag; and
   at least one second check valve communicated with the air storage bag, wherein an air inlet of said second check valve is communicated with the air storage bag, and an air outlet of said second check valve is communicated with a chamber of an inflatable product;
   a shell, wherein said at least one first check valve and said at least one second check valve are both arranged on said shell;
   a buffer air chamber arranged in said shell, and said buffer air chamber is communicated with said air storage bag, said at least one first check valve and said at least one second check valve are communicated through said buffer air chamber, and said shell is arranged in said buffer air chamber of said inflatable product; and
   wherein, said air storage bag is formed by an air-tight and elastic sheet protruding from one side to the other, and said air storage bag has an edge with a first groove and a second groove, and said first check valve and said second check valve are respectively arranged in said first groove and said second groove.

2. The air valve assembly according to claim 1, wherein hot-melt components are sleeved on the outer walls of said first check valve and said second check valve, and said hot-melt components are fixedly arranged in said shell.

3. The air valve assembly according to claim 2, wherein said hot-melt component comprises a first sleeve and a second sleeve which are clamped with each other, and said first check valve or said second check valve is embedded between said first sleeve and said second sleeve.

4. The air valve assembly according to claim 3, wherein an end of said at least one first check valve and an end of said at least one second check valve are both provided with snap rings, and said first sleeve and said second sleeve are respectively provided with a first clamping groove and a second clamping groove which are matched with both ends of said snap rings.

5. The air valve assembly according to claim 2, wherein said hot-melt component and said shell are both made of hot-melt materials, said at least one first check valve and said at least one second check valve are both made of elastic silica gel; and said at least one first check valve and said at least one second check valve are bonded to said hot-melt component, and said hot-melt component is hot-melt connected with said shell.

6. The air valve assembly according to claim 1, wherein said at least one first check valve comprises a valve body connector, which has a hollow structure; and a valve body is arranged in said valve body connector, and said valve body comprises a circular air inlet and a conical air outlet, and a ball is arranged in said air outlet; and wherein, one end of said valve body connector close to said air outlet is provided with a resisting part for preventing said valve body and said ball from slipping out of said valve body connector.

7. The air valve assembly according to claim 6, wherein said air inlet of said valve body is also provided with a tail part for preventing said valve body from falling out of said valve body connector.

8. The air valve assembly according to claim 6, wherein said valve body is made of a hard material; and said valve body connector is made of a flexible hot-melt material.

* * * * *